US012216901B2

(12) United States Patent
Li et al.

(10) Patent No.: US 12,216,901 B2
(45) Date of Patent: Feb. 4, 2025

(54) ENVIRONMENT- AND PREFERENCE-BASED APPLICATION AND OPERATION GUIDANCE SELECTION

(71) Applicant: International Business Machines Corporation, Armonk, NY (US)

(72) Inventors: Xiang Wei Li, Beijing (CN); Dong Chen, Beijing (CN); Ye Chuan Wang, Beijing (CN); Ting Ting Zhan, Beijing (CN); Ju Ling Liu, Beijing (CN); Yu An, Beijing (CN); Wei Yan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/948,490

(22) Filed: Sep. 20, 2022

(65) Prior Publication Data
US 2024/0094902 A1    Mar. 21, 2024

(51) Int. Cl.
*G06F 3/048* (2013.01)
*G06F 3/04895* (2022.01)
(Continued)

(52) U.S. Cl.
CPC .......... *G06F 3/04895* (2013.01); *G10L 15/22* (2013.01); *G09B 5/06* (2013.01); *G10L 2015/223* (2013.01)

(58) Field of Classification Search
CPC ................. G06F 3/04895; G10L 15/22; G10L 2015/223; G09B 5/06
See application file for complete search history.

(56) References Cited

U.S. PATENT DOCUMENTS 7,047,498 B2    5/2006  Lui et al.
9,654,598 B1 *  5/2017  Crawford .............. H04W 4/023
(Continued)

FOREIGN PATENT DOCUMENTS

CN    106569769 A       4/2017
CN    104207756 B  *    2/2018  .......... A61B 5/0059
(Continued)

OTHER PUBLICATIONS

Disclosed Anonymously, "A Method And System To Dynamically Generate System Guidance For Users," IP.com, PCOM000254067D, May 2018.

*Primary Examiner* — Rashawn N Tillery
(74) *Attorney, Agent, or Firm* — Steven M. Bouknight

(57) ABSTRACT

A method for selecting an application and associated operational guidance to utilize on a mobile device is disclosed. In one embodiment, such a method identifies a selected environment of interest. Within the selected environment, the method identifies one or more applications that are commonly utilized by users within the selected environment and documents the one or more applications. The method detects physical entry of a particular user into the selected environment and, in response to detecting the entry, automatically notifies the particular user of the one or more applications that are commonly utilized within the selected environment. In certain embodiments, the method enables the user to quickly launch the one or more applications and/or provides operational guidance to the user with regard to using the one or more applications. A corresponding system and computer program product are also disclosed.

14 Claims, 11 Drawing Sheets

(51) Int. Cl.
*G10L 15/22* (2006.01)
*G09B 5/06* (2006.01)

(56) References Cited

U.S. PATENT DOCUMENTS

| | | | | |
|---|---|---|---|---|
| 9,760,399 | B1* | 9/2017 | Fraser | G06F 9/485 |
| 10,673,854 | B2* | 6/2020 | Wu | G06F 8/62 |
| 10,771,847 | B2* | 9/2020 | Balsamo | G06F 8/61 |
| 11,204,616 | B2* | 12/2021 | Baker | G05F 1/66 |
| 11,228,675 | B2* | 1/2022 | Park | G06F 3/04817 |
| 11,249,821 | B1* | 2/2022 | Shah | G06F 9/44505 |
| 2010/0215340 | A1* | 8/2010 | Pettit | H04H 60/13 |
| | | | | 386/E5.003 |
| 2011/0028138 | A1* | 2/2011 | Davies-Moore | G06F 3/04817 |
| | | | | 455/418 |
| 2011/0214066 | A1* | 9/2011 | Chitturi | H04L 67/535 |
| | | | | 715/745 |
| 2014/0101611 | A1* | 4/2014 | Lang | G06F 21/32 |
| | | | | 709/204 |
| 2015/0006632 | A1* | 1/2015 | Tomkins | H04L 51/222 |
| | | | | 709/204 |
| 2015/0254216 | A1* | 9/2015 | DeLuca | G06F 40/134 |
| | | | | 715/206 |
| 2016/0104486 | A1* | 4/2016 | Penilla | G10L 15/02 |
| | | | | 704/232 |
| 2016/0110754 | A1* | 4/2016 | Miyazaki | G06Q 30/0241 |
| | | | | 705/14.39 |
| 2016/0360336 | A1* | 12/2016 | Gross | H04W 4/025 |
| 2017/0060888 | A1* | 3/2017 | Al Hassanat | H04W 4/029 |
| 2017/0197617 | A1* | 7/2017 | Penilla | H04W 4/029 |
| 2017/0322939 | A1* | 11/2017 | Byron | G06N 20/00 |
| 2019/0196851 | A1* | 6/2019 | Penilla | G09G 5/14 |
| 2019/0260601 | A1* | 8/2019 | Verlaan | H04L 51/04 |
| 2019/0339840 | A1* | 11/2019 | Park | G10L 15/00 |
| 2020/0045163 | A1 | 2/2020 | Hwang et al. | |
| 2020/0134488 | A1* | 4/2020 | Kim | G06F 3/04842 |
| 2021/0090750 | A1* | 3/2021 | Sadilek | G16H 50/30 |
| 2021/0103447 | A1* | 4/2021 | Wei | G06F 3/0481 |
| 2021/0133282 | A1* | 5/2021 | Garimella | G06F 3/0484 |
| 2021/0272183 | A1* | 9/2021 | Turnbull | G06Q 30/0635 |
| 2021/0397427 | A1* | 12/2021 | Haswell | H04L 63/083 |
| 2022/0027751 | A1* | 1/2022 | Hatfield | H04L 67/535 |
| 2022/0113394 | A1* | 4/2022 | Shin | G06N 20/00 |
| 2023/0062004 | A1* | 3/2023 | Okamoto | B60K 35/00 |
| 2023/0252540 | A1* | 8/2023 | Rathod | G06Q 30/0607 |
| | | | | 705/26.25 |

FOREIGN PATENT DOCUMENTS

| | | |
|---|---|---|
| WO | 2015034826 A1 | 3/2015 |
| WO | 2019042027 A1 | 3/2019 |

* cited by examiner

220

Application Directory

| Financial/Business | Social/Communication | Entertainment | Reading | Efficiency Tools |
|---|---|---|---|---|
| App A1 | App B1 | App C1 | App D1 | App E1 |
| A2 | B2 | C2 | D2 | E2 |
| A3 | B3 | C3 | D3 | E3 |
| A4 | B4 | C4 | D4 | E4 |
| A5 | B5 | C5 | D5 | E5 |
| A6 | B6 | C6 | D6 | E6 |
| A7 | B7 | C7 | D7 | E7 |
| ... | ... | ... | ... | ... |
| An | Bn | Cn | Dn | En |

| Users | Age | Daily or Frequently | Temporary in City | Have Used Alipay for Subway | Have Used T-Union | ... | Method |
|---|---|---|---|---|---|---|---|
| U0 | 30/100 | 1 | 0 | 1 | 1 | ... | Alipay |
| U1 | 18/100 | 0 | 1 | 1 | 0 | ... | One-Time Ticket |
| U2 | 50/100 | 1 | 0 | 0 | 1 | ... | China T-Union |
| U3 | 25/100 | 1 | 0 | 1 | 0 | ... | Alipay |
| ... | ... | ... | ... | ... | ... | ... | ... |

Fig. 4

ENVIRONMENT- AND PREFERENCE-BASED APPLICATION AND OPERATION GUIDANCE SELECTION

BACKGROUND

Field of the Invention

This invention relates to systems and methods for selecting an application and operational guidance to utilize based on an environment of a mobile device and/or preference of a user.

Background of the Invention

Mobile devices such as smart phones, as well as the applications that execute on these mobile devices, are becoming more and more ubiquitous. With increasing frequency, such mobile devices and associated applications are used to conduct business with a wide variety of establishments, many times while users frequent the establishments. For example, a supermarket application installed on a mobile device may enable a user to access digital coupons for various products in the supermarket, perform mobile ordering, view weekly ads or sale items, identify a user's rewards card or number, and even pay for products in the supermarket. Museums, entertainment venues, restaurants, stores, and other establishments may likewise enable users to interface with such establishments using their mobile devices and applications thereon.

However, the utility of a mobile device or applications installed thereon often depends on a user's familiarity with the device as well as the complexity of applications or other software that reside on the device. Users that are proficient in technology may have little or no problem using such mobile devices and applications. Other users that are less proficient may need assistance to use the mobile devices and the applications loaded thereon. This can undermine the efficiency gains that were intended to be achieved by use of the mobile devices and applications.

SUMMARY

The invention has been developed in response to the present state of the art and, in particular, in response to the problems and needs in the art that have not yet been fully solved by currently available systems and methods. Accordingly, systems and methods have been developed for selecting an application and associated operational guidance to utilize on a mobile device. The features and advantages of the invention will become more fully apparent from the following description and appended claims, or may be learned by practice of the invention as set forth hereinafter.

Consistent with the foregoing, a method for selecting an application and associated operational guidance to utilize on a mobile device is disclosed. In one embodiment, such a method identifies a selected environment of interest. Within the selected environment, the method identifies one or more applications that are commonly utilized by users within the selected environment and documents the one or more applications. The method detects physical entry of a particular user into the selected environment and, in response to detecting the entry, automatically notifies the particular user of the one or more applications that are commonly utilized within the selected environment. In certain embodiments, the method enables the user to quickly launch the one or more applications and/or provides operational guidance to the user with regard to using the one or more applications.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 3 is a table showing one embodiment of an application directory listing applications that may be launched on mobile devices in different environments;

FIG. 4 is a table provided to show an example of the process of FIG. 2 in a subway station;

DETAILED DESCRIPTION

Figure 1:
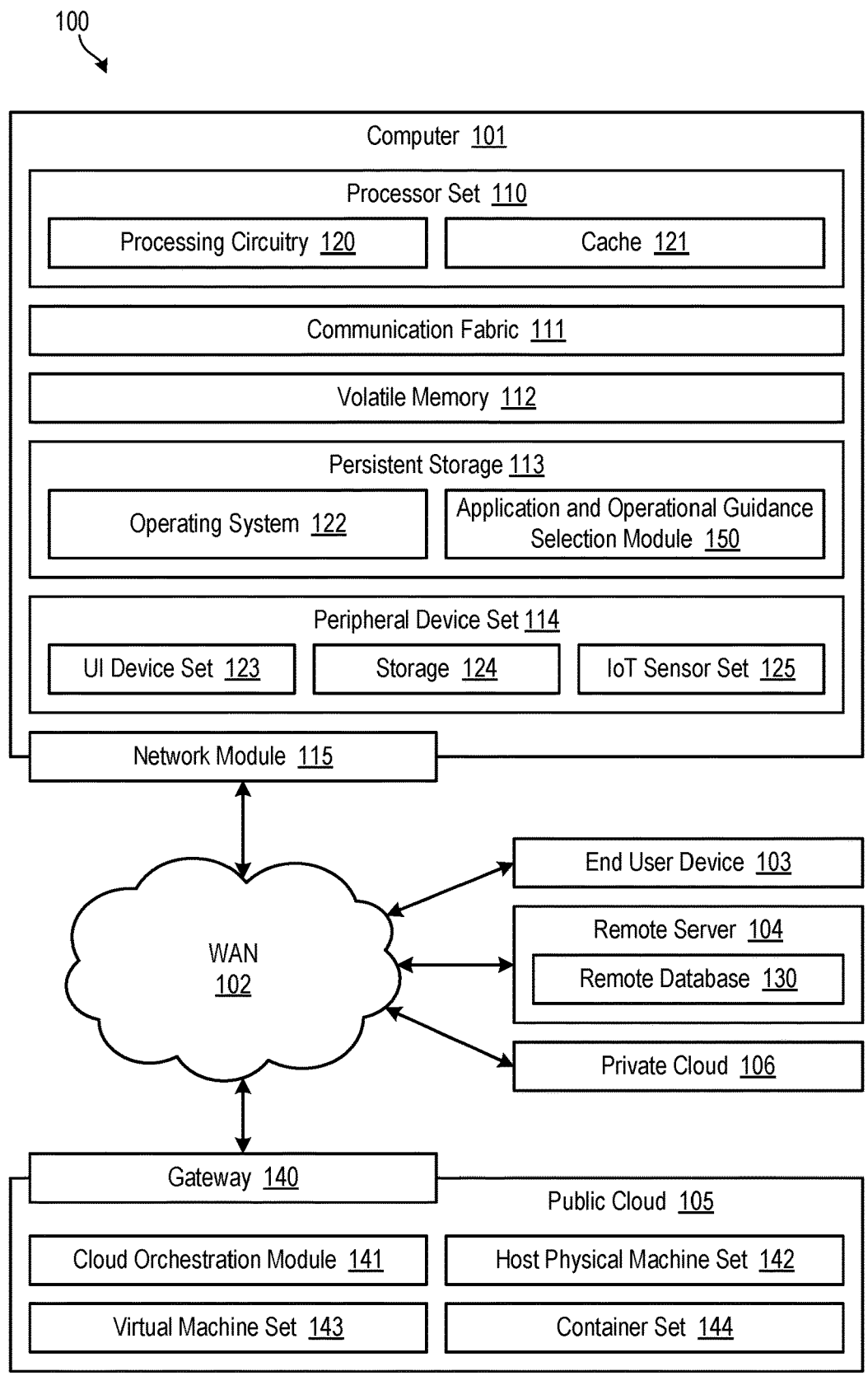
FIG. 1 is a high-level block diagram showing one example of a computing system for use in implementing various methods in accordance with the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods disclosed herein. This computer code may be collectively referred to as an application and operational guidance selection module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
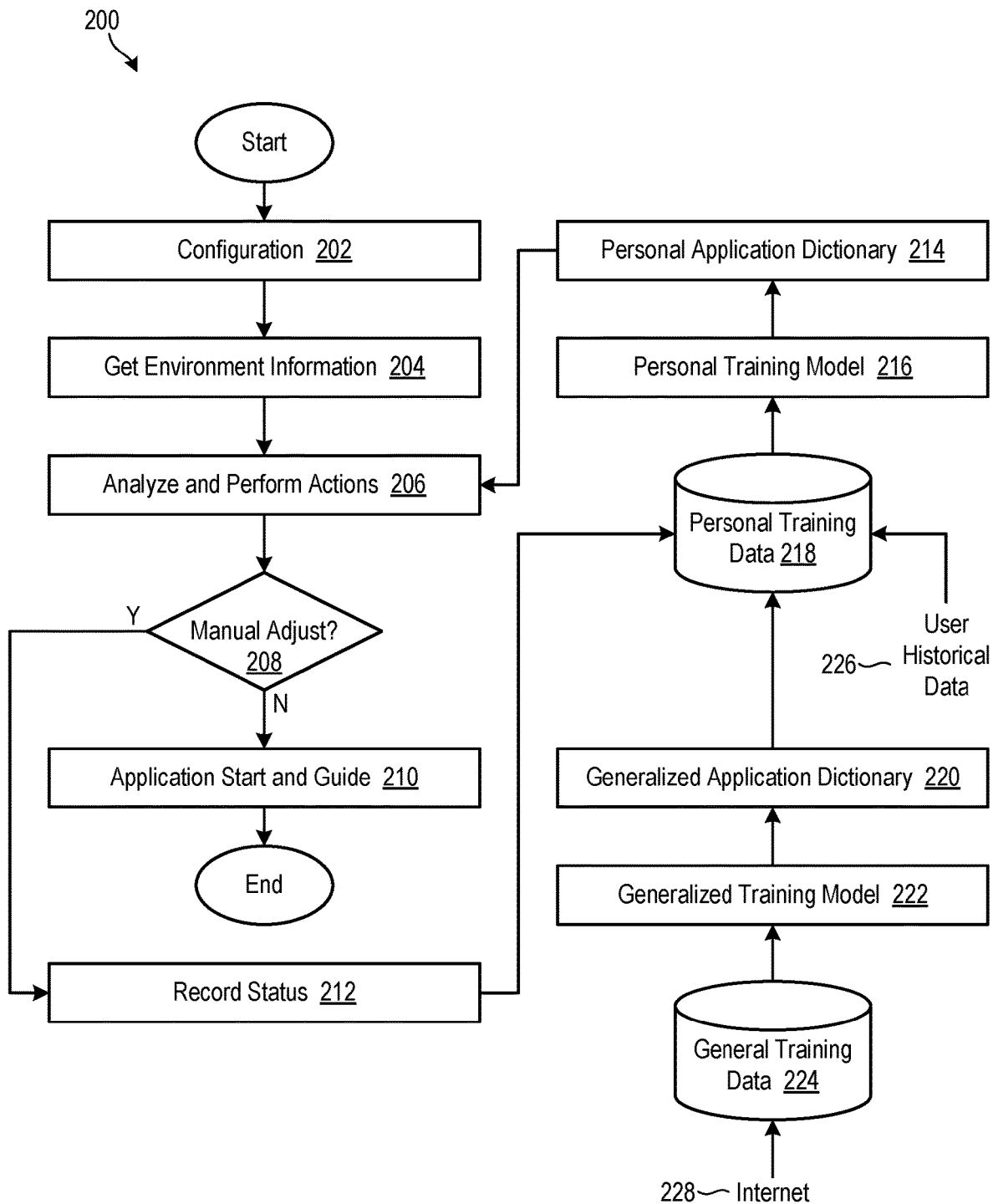
FIG. 2 is a process flow diagram showing one embodiment of a generalized method in accordance with the invention.

Referring to FIG. 2, as previously mentioned, mobile devices such as smart phones, as well as the applications that execute on these mobile devices, are becoming more and more ubiquitous. With increasing frequency, such mobile devices and associated applications are used to conduct business with a wide variety of establishments, many times while users frequent the establishments. For example, a supermarket application installed on a mobile device may enable a user to access digital coupons for various products in the supermarket, perform mobile ordering, view weekly ads or sale items, identify a user's rewards card or number, and even pay for products in the supermarket. Museums, entertainment venues, restaurants, stores, and other establishments may likewise enable users to interface with such establishments using their mobile devices and applications installed thereon.

However, the utility of a mobile device or applications installed thereon often depends on a user's familiarity with the device as well as the complexity of applications or other software that reside on the device. Users that are proficient in technology may have little or no problems using such mobile devices and applications. Other users that are less proficient may need assistance to use the mobile devices and the applications loaded thereon. This can undermine the efficiency gains that were intended to be achieved by use of the mobile devices and applications.

In view of the foregoing, systems and methods are needed to assist users with utilizing the correct or most effective applications in specific environments, as well as assisting users with performing needed steps or operations within those applications. Such systems and methods will ideally help users that are less proficient in technology, but may be used to assist virtually anybody or improve the efficiency of virtually anybody. In general, the disclosed systems and methods may be trained by detecting what applications and operational steps are being utilized when users enter specific environments (e.g., grocery stores, train stations, museums, etc.). Based on this training, when a specific user enters the same environment, the systems and methods may suggest (either automatically or in response to request) what applications should be used in the environment and/or what operational steps should be performed on those applications in order to perform various tasks. In certain cases, the applications may be loaded and/or launched automatically.

FIG. 2 shows a generalized method 200 in accordance with the invention. As shown, the method includes two types of training data 218, 224, namely general training data 224 and personal training data 218. The general training data 224 may be training data that is acquired or derived from the general population, such as applications that are used by the general population, the environments in which the applications are used, characteristics of users that use the applications, and the like. In certain embodiments, this data may be acquired from public sources such as those on the Internet. A generalized training model 222 may receive the general training data 224 as input to generate a generalized application dictionary 220 as output. This generalized application dictionary 220 may list applications in different fields and corresponding user characteristics such as average user age, gender, and location for each application, as well as the environments in which the applications are typically used. FIG. 3 shows one example of an application dictionary 220 that lists various applications (i.e., A1-An, B1-Bn, etc.) in various fields or categories (e.g., Financial/Business, Social/Communication, Entertainment, etc.).

Referring again to FIG. 2, the personal training data 218 may include data that is associated with a specific user, such as applications used by the specific user, the fields in which the applications are categorized, the environments in which the specific user has used the application, and preferences regarding which applications the specific user prefers to use. Historical data of the specific user as well as data in the generalized application dictionary 220 may provide input to the personal training data 218. A personal training model 216 may receive the personal training data 218 as input and generate a personal application dictionary 214 as output. The personal application dictionary 214 may list applications that the specific user uses, fields in which the applications are categorized, environments in which the applications are used by the specific user, and preferences with regard to which applications the specific user prefers to use. The personal application dictionary 214 may be continually updated to reflect the specific user's actions and preferences.

Once the generalized application dictionary 220 and personal application dictionary 214 are generated, the method 200 may configure 202 the system, such as enabling the system (i.e., enabling the system to assist users with utilizing the correct or most effective applications in specific environments, as well as assisting users with performing needed steps or operations within those applications). The method 200 may then get 204 environment information, such as the user's current location and/or other information about the environment in which the user is located. The method 200 may then analyze 206 and perform 206 various actions. For example, if users in a particular environment have used particular applications in the past, the method 200 may analyze the personal application dictionary 214 to determine if the specific user has a preference for these applications. If so, the method 200 may suggest or start 210 the applications for the specific user and/or provide 210 operational guidance to the user for these applications. If the user selects a different application than what is suggested at step 208, the method 200 may record 212 this status or deviation to update the specific user's preferences in the personal training data 218 and as a result the personal application dictionary 214.

FIG. 4 is a table 400 provided to show an example of the process of FIG. 2 when used in a subway station. As shown, the table shows four users, their ages, and other characteristics of the users. From the data shown in FIG. 4, some operational steps are listed such as buying a "one-time ticket" in the station, "us[ing] China T-union", "us[ing] Alipay", and so forth. In the current example, a K-Means algorithm is used with K=3 because there are three methods.

From the table 400, the users may be assigned the values: U0={0.3, 1, 0, 1, 1, . . . }, U1={0.18, 0, 1, 1, 0, . . . }, U2={0.5, 1, 0, 0, 1, . . . }, and U3={0.25, 1, 0, 1, 0, . . . }.

For epoch 1 in the analysis, data points K0, K1, and K2 are generated randomly. These may all be 1*t vectors, with t depending on the number of features. For example, K0={0.2, 0.03, 0.75, 0.34, 0.88, . . . }, or stated otherwise, K[0,1]=0.2, K[0,2]=0.03, K[0,3]=0.75 . . . }. Similarly, K1={ . . . } and K2={ . . . }. For users U0, U1, U2, and U3, a distance is calculated to the three K data points. The minimum distance is selected in order to assign the users to the clusters as indicated in the following equation, which establishes the distance between User m to K center n:

$$D_{mn} = \frac{1}{n}\sum_{i=0}^{i=n}(U[m, i] - K[n, i])^2$$

In this example, $n \in [0, 1, 2]$ and m depends on the number of users. All users may then be separated into three clusters. The center may then be calculated again for each cluster as indicated in the following equation which assumes x users in K0:

$$K0' = \left[\frac{1}{x}\sum U[x, 1], \frac{1}{x}\sum U[x, 2],\right.$$
$$\left.\frac{1}{x}\sum U[x, 3], \frac{1}{x}\sum U[x, 4], \frac{1}{x}\sum U[x, 5]\right]$$

Data points K1' and K2' may be updated in the same way. This results in new data points K0', K1', and K2'.

For epoch 2, all users may be separated into clusters for K0', K1', K2'. Then K means are updated for their own group members. For epoch n, if the group members do not change any more, the model is complete.

Figure 5:
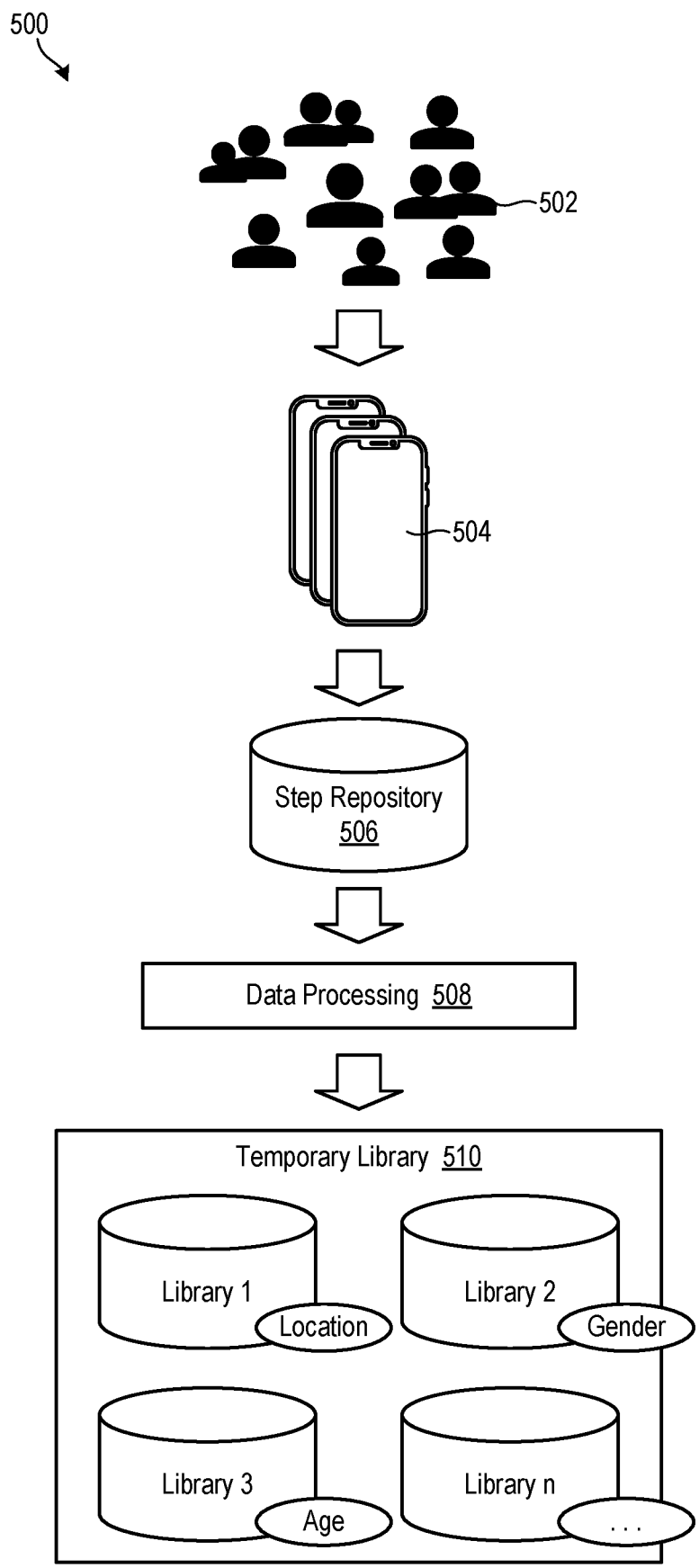
FIGS. 5 and 6 are process flow diagrams showing one embodiment of a method for building a model and using that model to select applications and associated operational steps to utilize on mobile devices when entering particular environments.
Figure 6:
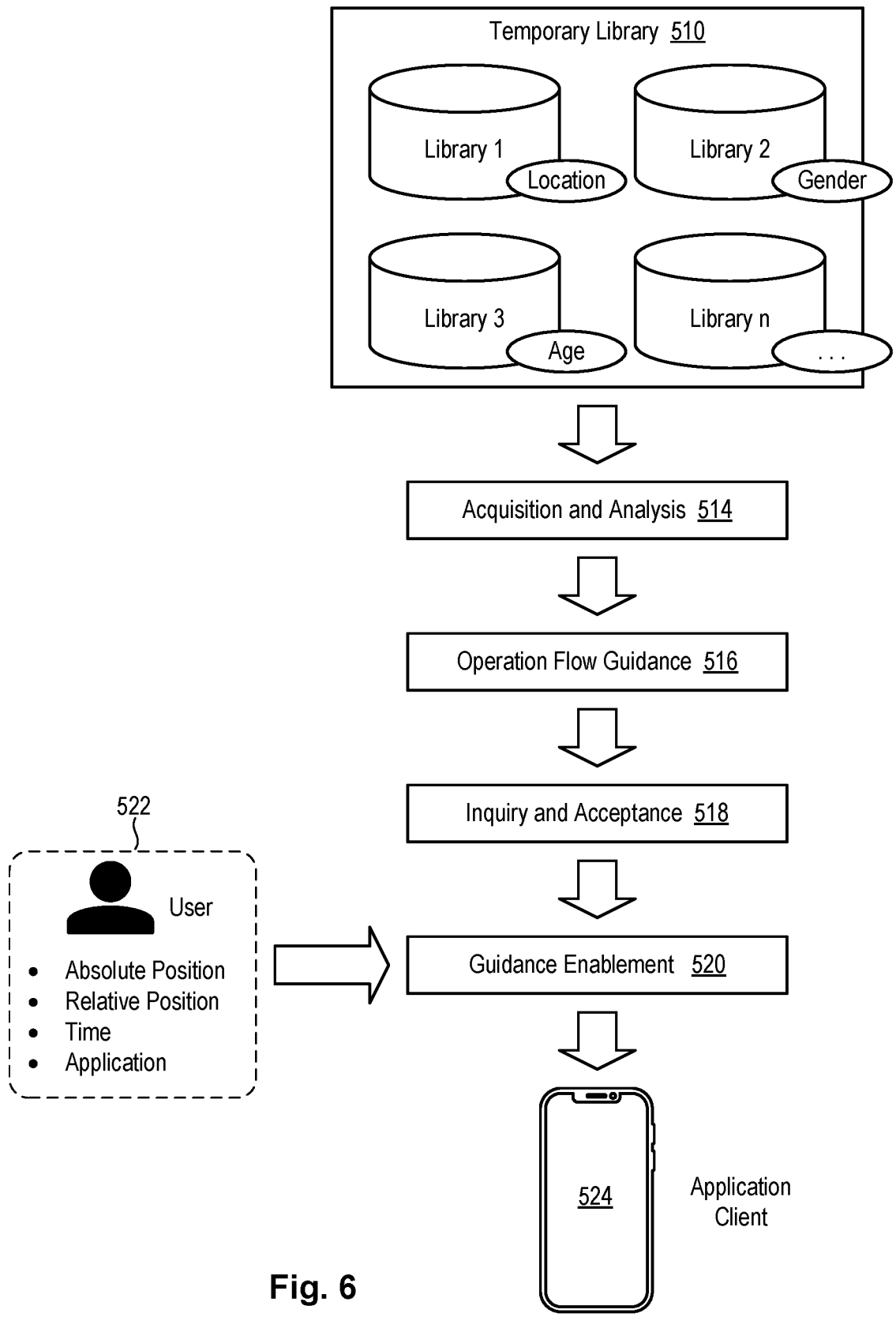

Referring to FIGS. 5 and 6, one embodiment of a method 500 in accordance with the invention is illustrated from the point of view of the client application. As shown, the method 500 starts with a population of users 502 that utilize various applications and perform various operational steps on the applications in different environments. Applications clients 504 may record the applications and operational steps as well as the environments in which they are utilized for recording in a step repository 506. Data processing 508 may be performed on the data in the step repository 506 to determine which applications and/or operational steps are used frequently in different environments, as well as the user characteristics (e.g., location, gender, age, etc.) of the users that utilize the applications and/or operational steps. This data may be stored in a temporary library 510.

As shown in FIG. 6, the data in the temporary library 510 may be acquired 514 and analyzed 514 to determine operational guidance 516 that may be used to assist users when utilizing applications in various environments. The method 500 may then inquire 518 whether a user wishes to utilize the operational guidance and the user may accept 518 this feature if desired. If the operational guidance is accepted by the user, the method 500 may enable 520 the operational guidance on the user's personal device (e.g., smartphone).

At this point, the method 500 may monitor for various characteristics of the user, such as the user's position (e.g., absolute and/or relative position), a current time, and an application that is preferred by the user. When the user enters a particular environment or other criteria are met, the method 500 may activate the operational guidance on an application client 524 residing on the user's device.

Figure 7A:
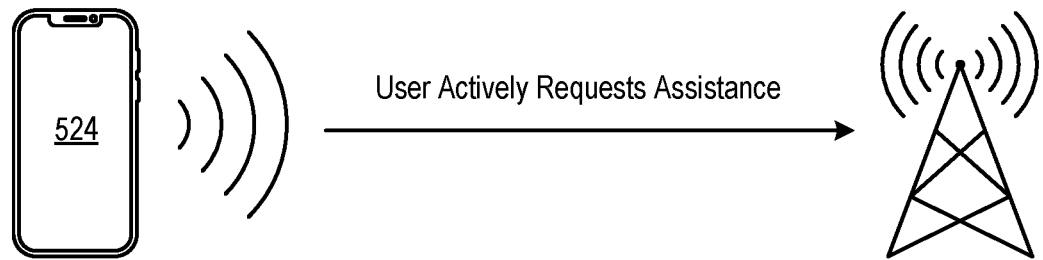
FIG. 7A shows a pull technique wherein a mobile device actively requests assistance to select an application and operational steps to use in a particular environment.
Figure 7B:
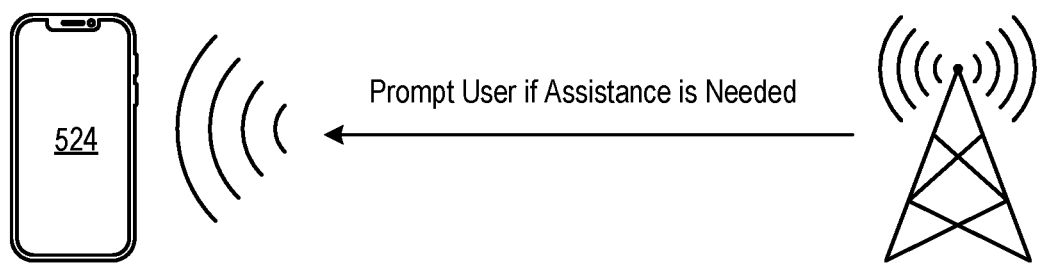
FIG. 7B shows a push technique wherein a mobile device is prompted if assistance is needed to select an application and operational guidance to use in a particular environment.

FIGS. 7A and 7B show two different techniques to enable a user to select an application and operational guidance to use in a particular environment. FIG. 7A shows a pull technique wherein a user of a mobile device actively requests, from a server or other device, assistance with selecting an application and operational steps to use in a particular environment. FIG. 7B shows a push technique wherein a user is asked if assistance is needed in selecting an application and operational steps to use in a particular environment. If the user accepts the prompt, an external source such as a server may provide the application and operational steps to the user's device.

Figure 8:
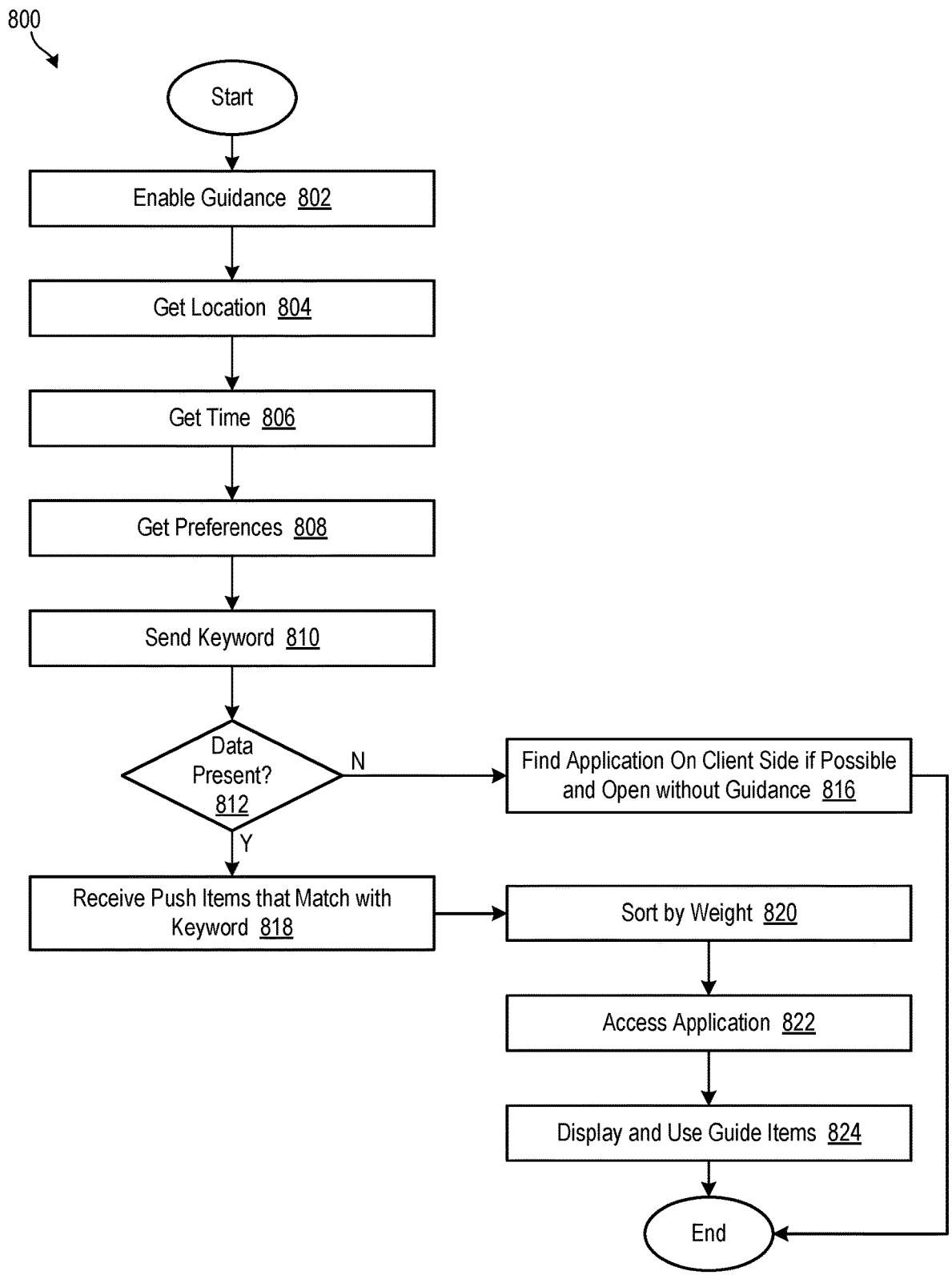
FIG. 8 is a process flow diagram showing one embodiment of a method in accordance with the invention that uses a pull technique.

Referring to FIG. 8, one embodiment of a method 800 that uses the pull technique described above is illustrated. As shown, the method 800 initially enables 802 guidance on a user's mobile device. The method 800 then retrieves 804 a location of the mobile device and retrieves 806 a current time. The method 800 then retrieves 808 preferences of the user, such as the user's preferred applications.

The method 800 may then send 810 a keyword (or phrase), entered by the user in the client application, to a server hosting the step repository 506. For example, if the user enters an environment of a science museum, the user might enter the phrase "buying a ticket" into the client application. The method 800 may then check the step repository 506 to determine if the step repository 506 stores any frequently-used ticket buying steps that were previously captured. If steps are not present in the step repository 506 at step 812, the user may need to find 816 an application on his or her own to purchase the ticket and open 816 and use this application without any guidance.

If, at decision step 812, steps are present in the step repository 506, the client application may receive 818 push items (i.e., applications, operational guidance, etc.) that match the keyword from the server. In certain embodiments, these items are sorted 820 by weight. The user may then select application(s) and/or operational guidance with the greatest weight and the user may access 822 the application(s) and/or operational guidance on the user's device, such as by downloading, installing, and launching the applications on the user's device, if the user has not done so already. If available, operational guidance may be shown 824 on the user's device to indicate what steps need to be performed on the applications to accomplish the user's goals (e.g., in the example above, buying a ticket, accessing information about the museum, etc.)

Figure 10:
FIG. 10 is a table showing a data structure that documents information related to installing applications on a user's device.

In certain embodiments, an installation data structure 1000, such as that illustrated in FIG. 10, may be generated on the server side, to store information related to installing an application on a user's device. This installation information may be provided to guide a user in the event the user needs to install an application on his or device to perform desired tasks. Among other information, the installation data structure 1000 may include information about the platforms on which the applications may be installed, where the applications originate, the installation directory of the applications, elements (i.e., components) of the applications that a user may select for installation, comments from users that utilize the applications, and exceptions that may occur during installation.

Figure 9:
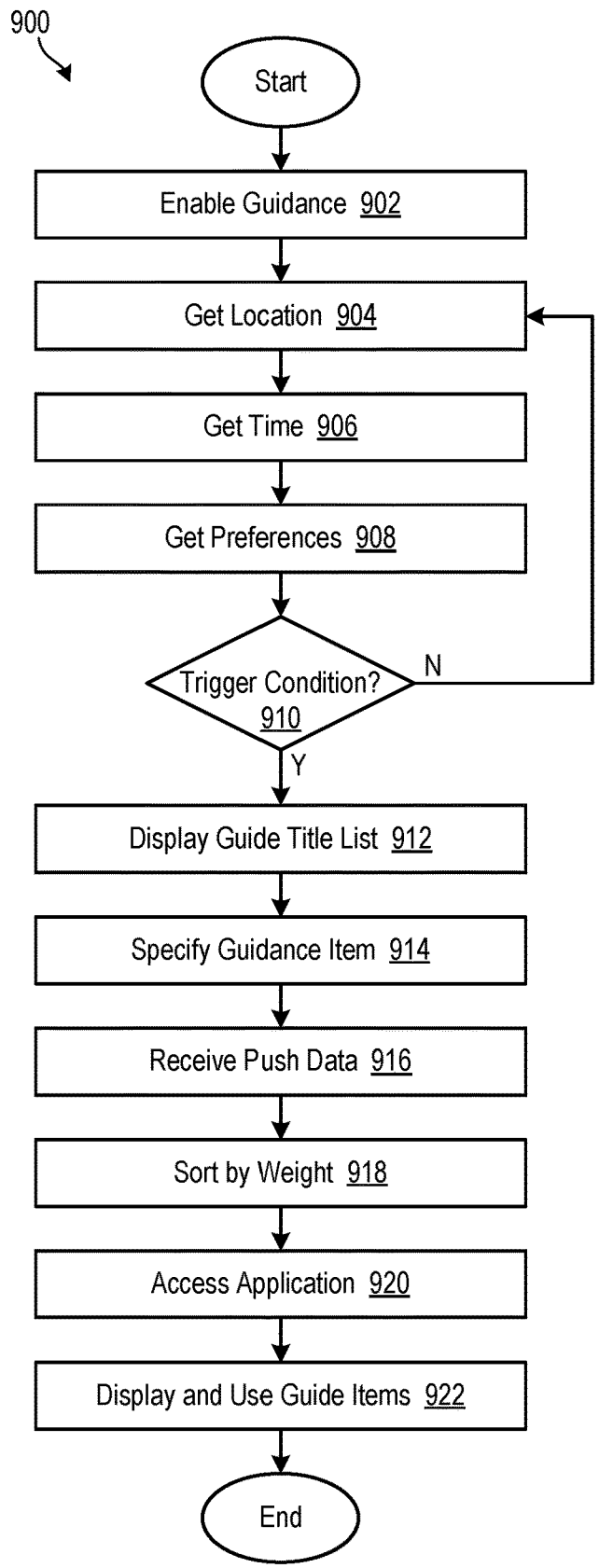
FIG. 9 is a process flow diagram showing one embodiment of a method in accordance with the invention that uses a push technique.

Referring to FIG. 9, one embodiment of a method 900 that uses the push technique described in FIG. 7B is illustrated. As shown, the method 900 initially enables 902 operational guidance on a user's mobile device. The method 900 then retrieves 904 a location of the mobile device and retrieves 906 a current time. The method 900 then retrieves 908 preferences of the user, such as the user's preferred applications.

When the user enters an environment (e.g., a museum or surrounding area in keeping with the example above) associated with one or more applications and/or operational guidance, the method 900 may trigger 910 retrieval of a list of applications and/or operational guidance that may be needed or desired by the user within that environment based on the user's location. In certain embodiments, the method 900 may automatically display 912 such a list on the user's device (using, for example, a client application in accordance with the invention). The user may then select 914 an item from the list.

The client application may then receive 916 push items (i.e., applications, operational guidance, etc.) in accordance with the user's selections. In certain embodiments, these items are sorted 918 by weight. The user may then select application(s) and/or operational guidance with the greatest weight that the user feels would be helpful, and the user may access 920 the application(s) and/or operational guidance such as by downloading, installing, and launching the applications on the user's device. In certain embodiments, an installation data structure 1000 such as that shown in FIG. 10 may assist with applications that need to be installed. If available, operational guidance may be shown 922 on the user's device to indicate what steps need to be performed on the applications to accomplish the user's goals (e.g. in the example above, buy a ticket, access information about the museum, etc.).

Figure 11:
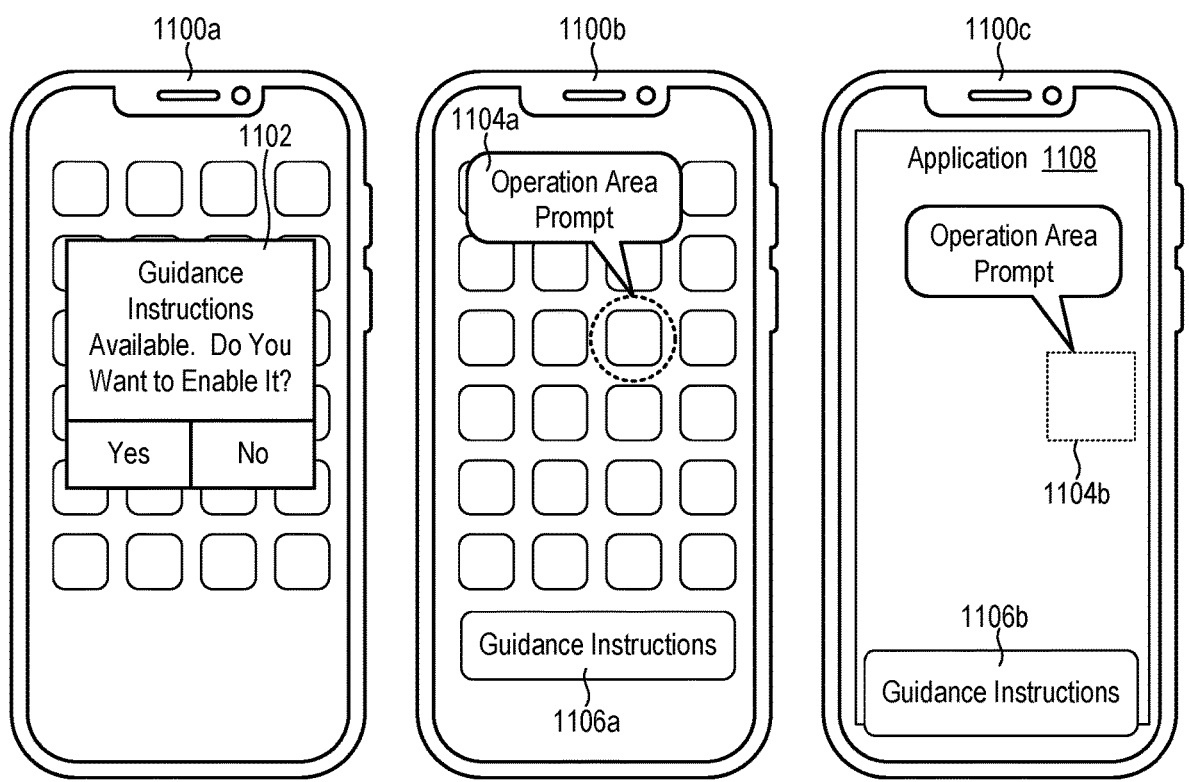
FIG. 11 is a high-level diagram showing how a system and method in accordance with the invention may provide assistance to a user on a mobile device such as a smartphone.

Referring to FIG. 11, one example of how a system and method in accordance with the invention may provide operational guidance to a user is illustrated. This is simply an example and is not intended to limit the scope of the inventive concepts disclosed herein. In certain embodiments, some or all of the inventive concepts shown in FIG. 11 may be implemented by a client application installed on a user's device.

As shown, in certain embodiments, when a user enters a particular environment or location, this may trigger functionality in the client application on the user's device. For example, upon entering a particular environment or location, the user may be presented with a message 1102 on the user's device 1100a. In this example, the message 1102 notifies the user that guidance instructions are available and asks the user if he or she would like to enable the guidance.

If the user selects "yes", in certain embodiments, the client application may guide the user with respect to applications that are helpful to accomplish various tasks (e.g., buy tickets, provide useful information, guide the user, etc.) in the selected location or environment. For example, in one embodiment, the client application may include an operation area prompt 1104 that shows the user which applications to select to perform various tasks in the environment. In certain embodiments, guidance instructions 1106a (i.e., operational guidance) may be provided that instructs the user what to do, such as which icon to select to launch an application, how to configure an application, how to install an application, or the like.

Once an application 1108 is launched on the user's device 1100c, the client application may provide guidance with respect to particular steps (e.g., data to enter, settings to configure, etc.) to perform in the application to accomplish various tasks. For example, an operation area prompt 1104b may be provided in the application 1108 to show the user which steps to perform in the application 1108. In certain embodiments, guidance instructions 1106b (i.e., operational guidance) may also be provided that instructs the user regarding the steps to perform or how to perform the steps indicated by the operation area prompt 1104b.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for selecting an application and associated operational guidance to utilize on a mobile device, the method comprising:
   identifying a selected environment of interest;
   determining at least one application that is commonly utilized in the selected environment by users including a particular user and a general population, further comprising determining operational steps commonly performed by the users including the particular user and the general population on and within the at least one application for executing one or more tasks using the at least one application;
   recording and documenting the at least one application and the operational steps commonly performed by the users within the selected environment of interest;
   detecting physical entry of the particular user into the selected environment; and
   in response to detecting the entry, automatically notifying the particular user of the at least one application that is commonly utilized within the selected environment based on the particular user and the general population, wherein the automatically notifying the particular user of the at least one application further comprises providing the associated operational guidance that includes the commonly performed operational steps for executing the one or more tasks on and within the at least one application based on the particular user and the general population.

2. The method of claim 1, further comprising enabling the user to quickly launch the at least one application.

3. The method of claim 1, wherein documenting the at least one application further comprises documenting the operational steps.

4. The method of claim 1, wherein providing the guidance to the user with regard to performing the operational steps further comprises providing commonly used data to the user to input into the at least one application.

5. The method of claim 1, wherein the determining further comprises using machine learning to determine the at least one application and the operational steps.

6. A computer program product for selecting an application and associated operational guidance to utilize on a mobile device, the computer program product comprising a computer-readable storage medium having computer-usable program code embodied therein, the computer-usable program code configured to perform the following when executed by at least one processor:
   identify a selected environment of interest;
   determining at least one application that is commonly utilized in the selected environment by users including a particular user and a general population, further comprising determining operational steps commonly performed by the users including the particular user and the general population on and within the at least one application for executing one or more tasks using the at least one application;
   recording and documenting the at least one application and the operational steps commonly performed by the users within the selected environment of interest;
   detecting physical entry of the particular user into the selected environment; and
   in response to detecting the entry, automatically notifying the particular user of the at least one application that is commonly utilized within the selected environment based on the particular user and the general population, wherein the automatically notifying the particular user of the at least one application further comprises providing the associated operational guidance that includes the commonly performed operational steps for executing the one or more tasks on and within the at least one application based on the particular user and the general population.

7. The computer program product of claim 6, wherein the computer-usable program code is further configured to enable the user to quickly launch the at least one application.

8. The computer program product of claim 6, wherein documenting the at least one application further comprises documenting the operational steps.

9. The computer program product of claim 6, wherein providing the guidance to the user with regard to performing the operational steps further comprises providing commonly used data to the user to input into the at least one application.

10. The computer program product of claim 6, wherein the determining further comprises using machine learning to determine the at least one application and the operational steps.

11. A system for selecting an application and associated operational guidance to utilize on a mobile device, the system comprising:
   at least one processor;
   at least one memory device operably coupled to the at least one processor and storing instructions for execution on the at least one processor, the instructions causing the at least one processor to:
   identify a selected environment of interest;
   determine at least one application that is commonly utilized in the selected environment by users including a particular user and a general population, further comprising determining operational steps commonly performed by the users including the particular user and the general population on and within the at least one application for executing one or more tasks using the at least one application;
   record and document the at least one application and the operational steps commonly performed by the users within the selected environment of interest;
   detect physical entry of the particular user into the selected environment; and
   in response to detecting the entry, automatically notify the particular user of the at least one application that is commonly utilized within the selected environment based on the particular user and the general population, wherein the automatically notifying the particular user of the at least one application further comprises providing the associated operational guidance that includes the commonly performed operational steps for executing the one or more tasks on and within the at least one application based on the particular user and the general population.

12. The system of claim 11, wherein the instructions further cause the at least one processor to enable the user to quickly launch the at least one application.

13. The system of claim 11, wherein documenting the at least one application further comprises documenting the operational steps.

14. The system of claim 11, wherein providing the guidance to the user with regard to performing the operational steps further comprises providing commonly used data to the user to input into the at least one application.

* * * * *